(12) United States Patent
Housty

(10) Patent No.: US 8,392,640 B2
(45) Date of Patent: Mar. 5, 2013

(54) PRE-MEMORY RESOURCE CONTENTION RESOLUTION

(75) Inventor: Oswin E. Housty, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 636 days.

(21) Appl. No.: 12/630,780

(22) Filed: Dec. 3, 2009

(65) Prior Publication Data

US 2011/0138091 A1    Jun. 9, 2011

(51) Int. Cl.
*G06F 13/24*    (2006.01)
(52) U.S. Cl. ............................................ 710/260; 713/1
(58) Field of Classification Search .................. 713/1, 2; 710/260, 263–267
See application file for complete search history.

(56) References Cited

U.S. PATENT DOCUMENTS

| | | | |
|---|---|---|---|
| 5,511,200 A * | 4/1996 | Jayakumar | 710/266 |
| 6,154,790 A * | 11/2000 | Pruett et al. | 710/15 |
| 6,564,276 B1 | 5/2003 | Tyner | |
| 7,370,186 B1 * | 5/2008 | Lilliebjerg | 713/1 |
| 7,457,900 B2 | 11/2008 | Panesar | |
| 8,181,000 B2 * | 5/2012 | Uhler | 712/200 |
| 2005/0081071 A1 | 4/2005 | Huang et al. | |
| 2010/0030939 A1 * | 2/2010 | Litovtchenko et al. | 710/263 |

FOREIGN PATENT DOCUMENTS

WO    2006/021129    3/2006

OTHER PUBLICATIONS

International Search Report and Written Opinion for Application No. PCT/US2010/058756 dated May 23, 2011, 13 pages.

\* cited by examiner

*Primary Examiner* — Clifford Knoll

(57) ABSTRACT

Techniques are disclosed relating to resource contention resolution in a pre-memory environment. Prior to system memory being accessible, a resource control processing element controls access to a hardware resource by a plurality of processing elements by granting received requests from the processing elements for access to the resource. The resource control processing element may prioritize requests based on a determined amount of utilization of the hardware resource by individual ones of the processing elements. In one embodiment, processing elements request for information from a bus controller (e.g., an SMBus controller) that is usable to initialize system memory. The resource control processing element may respond to the requests by retrieving the requested information from the controller and providing that information to the processing element or by retrieving the requested information from a cache and providing that information to the processing element.

21 Claims, 7 Drawing Sheets

PRE-MEMORY RESOURCE CONTENTION RESOLUTION

BACKGROUND

1. Technical Field

This disclosure relates generally to resource allocation in a computer system and, more specifically, to resolving resource contention in a computer system operating in a pre-memory state.

2. Description of the Related Art

Resource contention in a computer system can occur when multiple processors try to concurrently access a shared resource. Traditionally, resource contention is managed using data structures such as locks or semaphores that are stored in system memory.

When a computer system boots up, however, system memory (e.g., "main memory") is not immediately accessible to system processors because it has not yet been initialized. In this "pre-memory" environment, resource contention can cause starvation. For example, if access to a resource is obtained on a first-come, first-serve basis, certain processors may be more likely to gain access to a resource while others may rarely or never gain access in a timely manner, resulting in slower boot times. Slow boot times may also be exacerbated by the fact that the resource may only be available via a (relatively) slow bus. Furthermore, access to the resource may be serialized, resulting in an increase in execution time.

Resources may also be inefficiently utilized since they are accessed only whenever processors require data and remain idle when processors are executing other tasks. In addition, when a processor gains control of the resource, it may maintain control even when it is not using the resource, preventing other processors from accessing the resource at the same time. In some instances, this can result in a further delay of overall processor execution time, again leading to slower boot times.

SUMMARY

Various embodiments for resolving resource contention in a computer system operating in a pre-memory state are disclosed. In one embodiment, a method is disclosed. The method includes a first of a plurality of processing elements in a computer system sending a request to a resource control processing element, where the request is to access a system resource that is shared by the plurality of processing elements, and where the request occurs during initialization of the computer system and prior to a main memory of the computer system being accessible by the plurality of processing elements. The method further includes, responsive to the request, the resource control processing element indicating to the first processing element whether access to the system resource is granted.

In some embodiments, the system resource is a system management bus (SMB) controller, and the method further includes the first processing element using the SMB controller to configure a memory controller to communicate with the main memory, where the using is in response to the first processing element being granted access to the SMB controller.

In some embodiments, the request is for a set of data, and the method further includes the resource control processing element retrieving, responsive to the request, the set of data using the system resource. The method further includes the resource control processing element providing the retrieved set of data to the first processing element.

In some embodiments, the method further includes the resource control processing element retrieving a set of data from the system resource prior to the sending and the resource control processing element storing the retrieved set of data in a cache of the resource control processing element. The method further includes the resource control processing element providing the set of data to the first processing element responsive to the request.

In some embodiments, the method further includes the resource control processing element storing the request in a queue with a plurality of other requests from the plurality of processing elements, where the request is stored until the resource control processing element can grant the first request.

In one embodiment, a system is disclosed. The system includes a hardware resource, a plurality of processing elements, and a resource control processing element. The resource processing element is configured to control access to the hardware resource by the plurality of processing elements, including by granting access to the hardware resource in response to requests made by the plurality of processing elements prior to a volatile memory of the system being initialized.

In some embodiments, the system further includes the volatile memory, where the volatile memory is configurable to be accessed by one or more of the plurality of processing elements. The system further includes a nonvolatile memory having program instructions stored therein. The program instructions are executable by the resource control processing element to receive a request from a first of the plurality of processing elements, where the request is to access the hardware resource, and where the request is received during initialization of the system prior to the volatile memory being configured to be accessed by the plurality of processing elements. The program instructions are further executable to determine whether the hardware resource is available to be accessed and in response to determining that the hardware resource is available, grant the first processing element access to the hardware resource.

In one embodiment, a computer-readable storage medium is disclosed. The computer-readable storage medium has program instructions stored thereon that, when executed by a computer system, cause the computer system to perform operations. The operations include performing an initialization procedure that causes a volatile main memory of the computer system to be accessible by a plurality of processing elements of the computer system. The initialization procedure includes, prior to the volatile memory being accessible by the plurality of processing elements, a first of the plurality of processing elements sending, to a second of the plurality of processing elements, a request for utilization of a hardware resource of the computer system. The operations further include the second processing element granting the first processing element access to the hardware resource in response to the hardware resource being available.

In one embodiment, an apparatus is disclosed. The apparatus includes a processing element configured to communicate with a resource control processing element and a shared hardware resource during a prememory state. During the prememory state, the processing element is configured to send a request to the resource control processing element to access the shared hardware resource, and to receive a response to the request indicating that the processing element has been granted access to the shared hardware resource.

DETAILED DESCRIPTION

Figure 1:
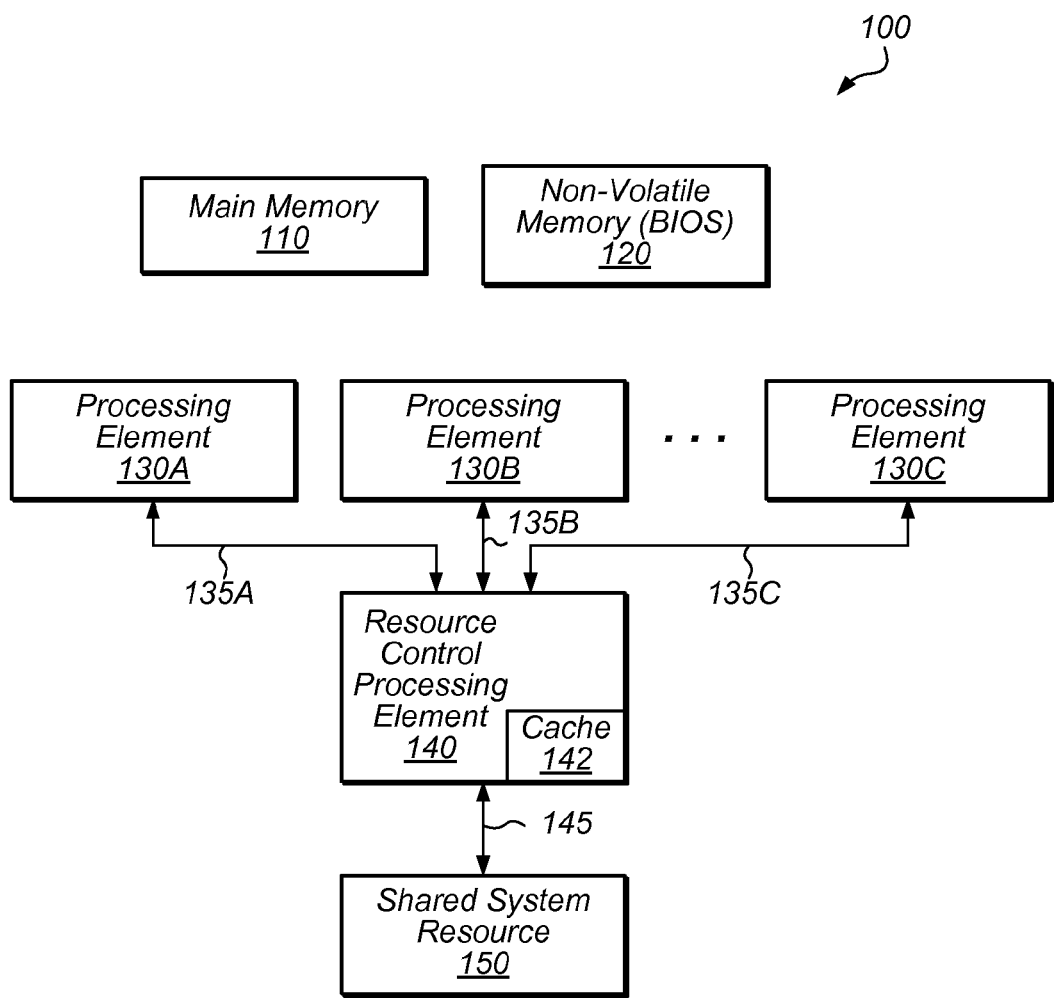
FIG. 1 is a block diagram illustrating one embodiment of a system that includes a mechanism to resolve resource contention, including pre-memory resource contention.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"Computer System." This term has its ordinary and accepted meaning in the art, and includes one or more computing devices operating together and any software stored thereon. A computing device includes one or more processor units and a memory subsystem. A memory subsystem may store program instructions executable by the one or more processor units.

"Processing Element." This term refers broadly to any circuitry that is configured to execute program instructions. The term may refer to a processor (e.g., a central processing unit (CPU)). This term may refer to individual processing cores within a multicore processor, as well as to a die that itself includes multiple cores.

"Resource." As used herein, this term refers to a hardware element/device/location that is accessible by a processing element within a computer system. Examples of a resource might include (without limitation) sensor devices, bus devices (e.g., a system management bus (SMBus) controller), storage devices, I/O devices, etc.

"Resource Control Processing Element." This term refers broadly to any circuitry that is configured to control access to one or more resources. One example of resource control processing element is a processing element that is configured to control access to a resource by other processing elements.

"Processing core." This term has its ordinary and accepted meaning in the art, which includes circuitry for executing program instructions. A processing core may be one of several processing cores within a multicore processor.

"Socket." As used herein, a "socket" refers both to a structure for coupling a processor to a motherboard, along with the processor itself. The processor may include one or more processing elements (e.g., cores).

"Volatile Memory." This term has its ordinary and accepted meaning in the art, which includes any memory that loses its content when power is removed. One example of volatile memory might be random access memory (RAM) such as SRAM, EDO RAM, SDRAM, DDR SDRAM, Rambus® RAM, etc.

"Nonvolatile Memory." This term has its ordinary and accepted meaning in the art, which includes any memory that does not lose its content when power is removed. One example of nonvolatile memory is a read only memory (ROM). As described herein, nonvolatile memory can be used to store system firmware.

"Main Memory." This term has its ordinary and accepted meaning in the art, which includes any primary temporary storage utilized by processing elements during operation of a computer system. This term applies to memory that is external to a processing element (e.g., the term does not refer to onboard cache memory). One example of main memory is volatile memory that is coupled to processing elements via a bus. In contrast, "secondary" storage refers to permanent storage devices such as hard disks, optical drives, tape drives, etc.

"Pre-memory." This term has its ordinary and accepted meaning in the art, which includes an operating state of a computer system in which main memory is not accessible by processing elements because it has not been initialized.

"Bootstrapping." This term has its ordinary and accepted meaning in the art, which includes the process of initializing a computer system during system startup. This process may include initializing main memory and loading an operating system.

"Bootstrapping processor." This term has its ordinary and accepted meaning in the art, which includes a processor that initiates performance of a bootstrapping procedure for a computer system. In one instance, one of a number of processing elements may serve as the bootstrapping process to execute code from firmware to initialize the system and/or other processing elements.

"Northbridge." This term has its ordinary and accepted meaning in the art, which includes a memory controller that handles high speed communication among a processor, main memory, any AGP or PCI Express devices, a Southbridge, etc.

"Southbridge." This term has its ordinary and accepted meaning in the art, which includes an I/O controller that handles a processor's communication with slower-speed devices such as mass storage devices, USB devices, SMBus devices, etc.

"system management bus." When used without capitalization, this term generically refers to a bus that is used to control various devices of the computer system. One example of a system management bus is SMBus. For example, a processor may use a system management bus to communicate with a serial presence detect (SPD) device to initialize various hardware components.

Turning now to FIG. 1, one embodiment of a system 100 for resolving resource contention is disclosed. In the illustrated embodiment, system 100 includes a main memory 110, a non-volatile memory (BIOS) 120, and a plurality of processing elements 130A-C. In some embodiments, when system 100 boots up, processing elements 130 may begin executing instructions loaded from a non-volatile memory (BIOS) 120. At this point, system 100 is operating in a pre-memory environment because main memory 110 has not been initialized. Accordingly, memory 110 is currently inaccessible by processing elements 130.

During an initialization of system 100, processing elements 130 may need to obtain data from one or more resources 150 that are shared among the processing elements 130. Since main memory 110 is not yet accessible, system 100 is unable to manage access to the resources 150 by storing data structures such as locks or semaphores in memory 110. Accordingly, resource contention among processing elements 130 for shared system resources (such as 150) can cause inefficient usage of resources as well as starvation of one or more processing elements 130. Such resource contention can result in slower boot times for system 100.

In order to prevent these problems, the present disclosure describes embodiments in which a resource control processing element 140 controls access to one or more shared system resources, including when the system is operating in a pre-memory state, by granting requests to access resources 150, where the requests have been received from processing elements 130 (e.g., via interconnects 135A-C). In some embodiments, these requests may request specific data from a resource 150, or they may request permission to directly utilize a resource 150. For example, in one embodiment, a processing element 130 may need data from an SMBus controller in a Southbridge of system 100 during boot up. The processing element 130 may send a request to a resource control processing element 140 for any desired data. Alternately, processing element 130 may request permission to retrieve the data directly from the SMBus controller. (Note that the SMBus example is given as one particular example of a system resource, this disclosure is in no way limited in this regard.)

As will be described below, once a resource 150 is available for use (i.e., it is not currently in use by another processing element 130 or by processing element 140), the resource control processing element 140 may grant one of the received requests by providing the requested data or by indicating that the processing element 130 is permitted to utilize the resource 150. In one embodiment, resource control processing element 140 also stores any retrieved data in a cache 142 for responding to future requests. In some embodiments, a resource control processing element 140 may grant requests in a predetermined order based on based on how often processing elements 130 use particular resources 150.

By managing control to resources 150 without using main memory 110, resource control processing elements 140 can optimize the use of shared resources 150 and prevent starvation for resources 150, including during pre-memory operation. Thus, system 100, in some embodiments, can significantly reduce system startup times.

Figure 2:
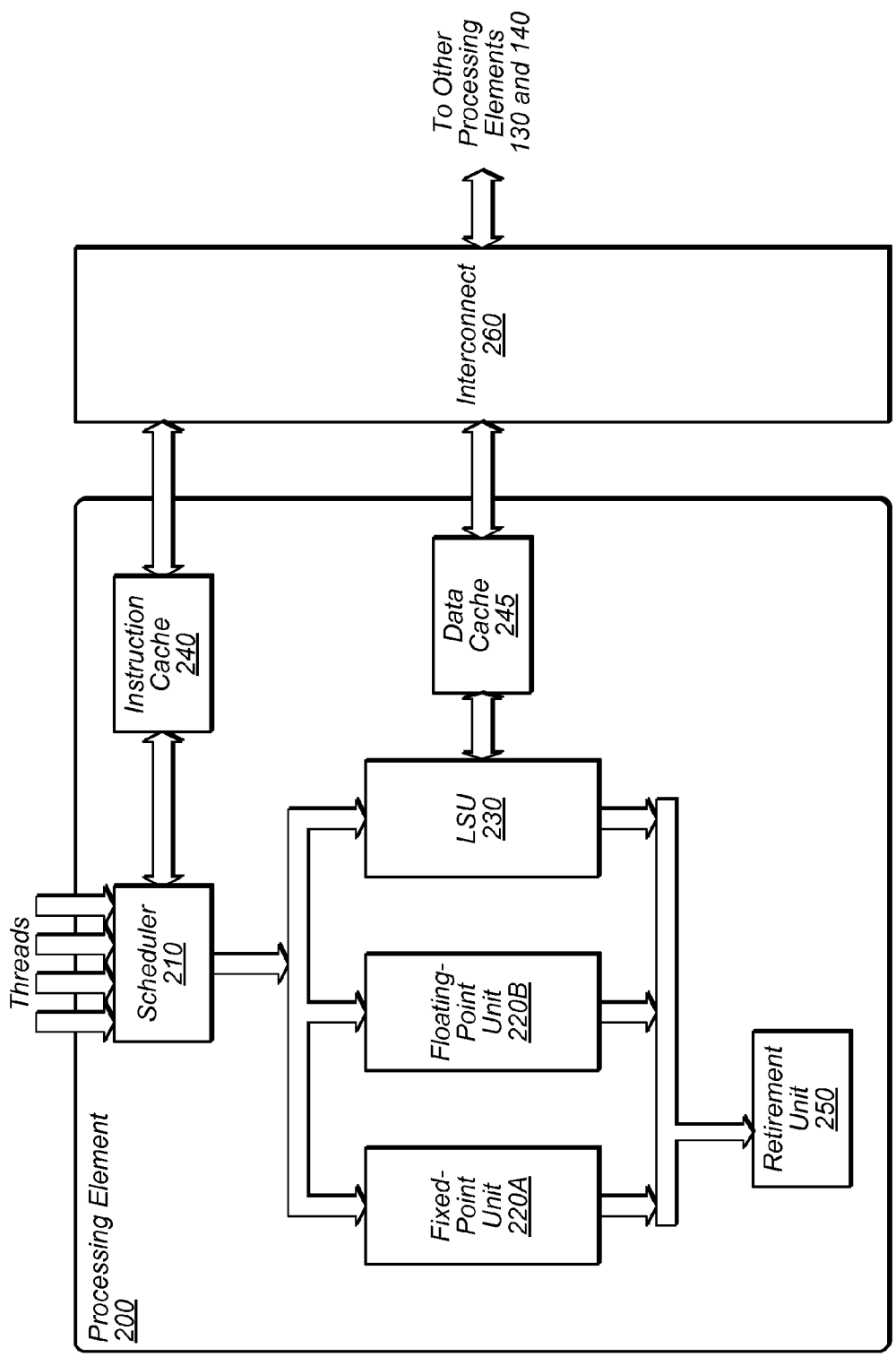
FIG. 2 is a block diagram illustrating one embodiment of a representative processing element.

Turning now to FIG. 2, one embodiment of a processing element 200 for implementing processing elements 130 and/or 140 is shown. In one embodiment, processing elements 130 and 140 may be individual processors located on separate dies. In another embodiment, processing elements 130 and 140 may be separate cores located on one or more sockets. In one embodiment, processing elements 130 and 140 may be similar in structure (e.g., processing element 140 is a processing element 130 that has been selected to function as an element 140). In other embodiments, processing element 140 may include additional logic for performing resource contention resolution functions.

In the illustrated embodiment shown in FIG. 2, processing element 200 includes a scheduler unit 210, fixed-point and floating-point units 220A and 220B, load store unit (LSU) 230, and retirement unit 250. Note that processing element 200 is representative of a wide variety of possible configurations. In one embodiment, scheduler unit 210 is coupled to instruction cache 240 within processing element 200, although other embodiments may not include cache 240. Similarly, LSU 230 may be coupled to a data cache 245 as shown in FIG. 2. Other embodiments of element 200 may not include cache 245. In various embodiments, processing element 200 includes one or more functional units. Note that functional units 220 and 230 shown in FIG. 2 are exemplary, and may not be included in processing element 200 in various embodiments. In some embodiments, processing element 200 may be coupled to a Northbridge or one or more other processing elements 200 via interconnect 260.

In one embodiment, processing element 200 is a multi-threaded processor unit configured to execute a plurality of threads (e.g., 4 threads). The instructions of various threads are dispatched through scheduler unit 210 to units 220 or 230 for execution. In one embodiment, scheduler unit 210 may contain logic to fetch and decode instructions to prepare them for execution in subsequent blocks. In one embodiment, scheduler unit 210 may include logic to fetch instructions from instruction cache 240. Scheduler unit 210 may also implement logic to handle instruction cache misses and translation of virtual instruction fetch addresses to physical addresses (e.g., scheduler unit 210 may include an instruction translation lookaside buffer (ITLB) or hardware to perform a page table walk). In some embodiments, scheduler unit 210 may route the decoded instructions to units 220 and 230 based on information in the instructions. In various embodiments, scheduler unit 210 may implement a variety of scheduling techniques. For example, in one embodiment, scheduler unit 210 may queue instructions and schedule them using an out-of-order execution (OoOE) algorithm. Additionally, in some embodiments, scheduler unit 210 may include logic to predict branch outcomes and/or fetch target addresses.

Fixed and floating-point units 220A and 220B are merely representative of functional units that may be present within one embodiment of processing element 200. These units may contain logic to execute and generate results for various types of instructions. For example, the various instructions may perform arithmetic, logical, or shift operations. In various embodiments, units 220 may include one or more arithmetic logic units (ALUs) for performing such operations.

Load store unit 230 contains logic for executing load and store instructions. In one embodiment, load store unit 230 may include logic to handle loading and storing data to a data cache 245. In certain embodiments, load store unit 230 may implement logic to handle data cache misses and translation of virtual addresses to physical addresses (e.g., load store unit 230 may include a Data Translation Lookaside Buffer (DTLB) or hardware to perform page table walks).

In one embodiment, retirement unit 250 contains logic for retiring execution results received from units 220 and 230. In some embodiments, retirement unit 250 may be coupled to (or physically contain) one or more register banks for storing state information, in which retirement unit 250 may update the state information in the registers as execution results are received. In one embodiment, this state information may include data identifying an executing thread (e.g., a thread ID) or the corresponding process of the executing thread (e.g., a process ID). In various embodiments, retirement unit 250 may contain logic to queue a set of instructions as they are received after out-of-order execution (OoOE) and to reorder the set during retirement. In another embodiment, retirement unit 250 may contain trap logic for handling exceptions thrown during the execution of various instructions (e.g., a page fault exception).

Figure 3:
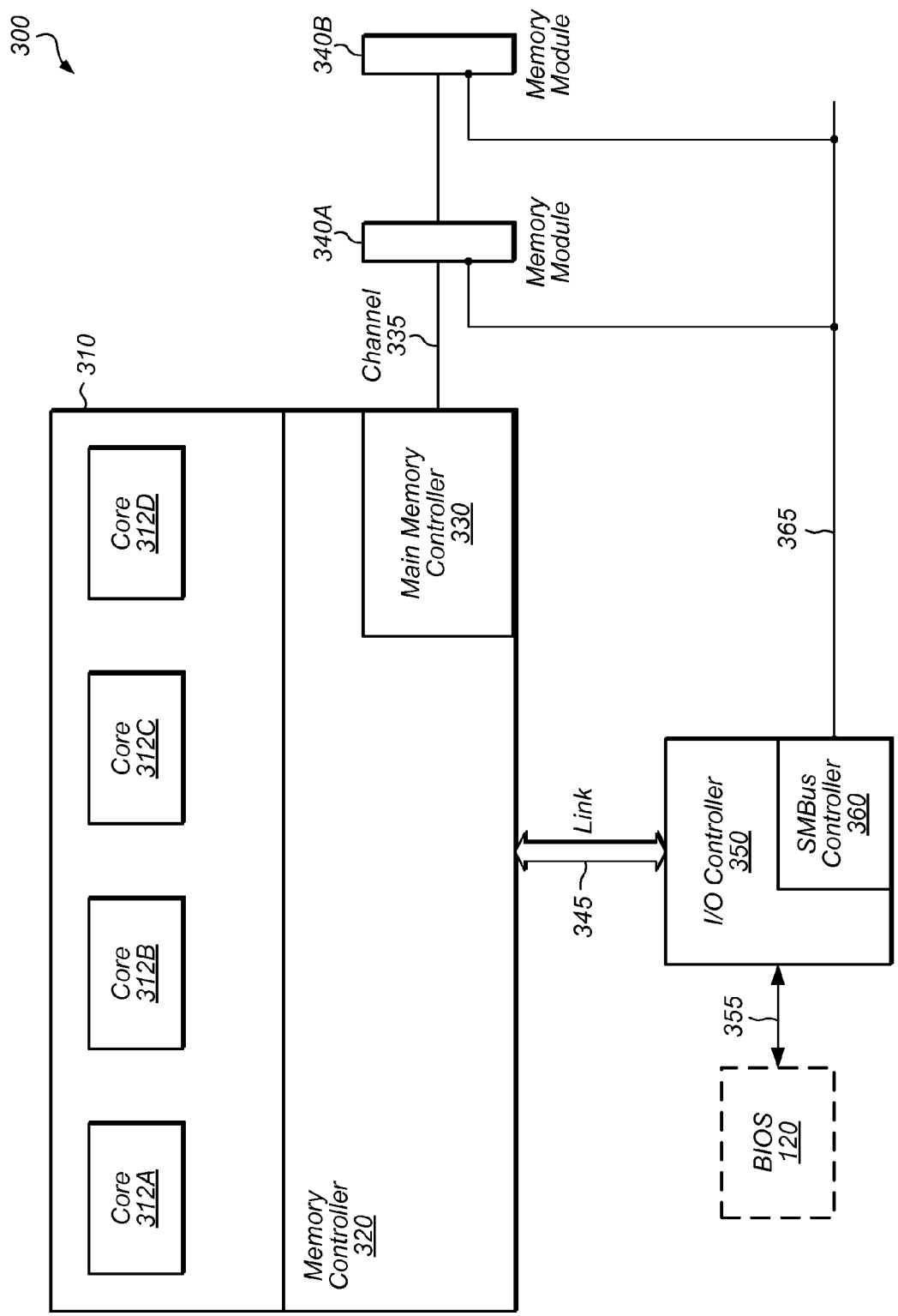
FIG. 3 is a block diagram illustrating one embodiment of a system including a socket and a volatile memory.

Turning now to FIG. 3, one embodiment of a system 300 including a socket and a volatile memory is depicted. As will be described below, an SMBus controller is one embodiment of a resource 150 that is usable by one or more processing elements 130 to initialize a volatile memory. A resource 150, of course, may be of a variety of resources such as (without limitation) sensor devices, bus devices, storage devices, I/O devices, etc.

In the illustrated embodiment, socket 310 includes a plurality of cores 312A-D and a memory controller 320 (e.g., a Northbridge) that includes a main memory controller 330. Main memory controller 330, in turn, is coupled to memory modules 340A and 340B via channel 335. Memory controller 330 is coupled to an I/O controller 350 (e.g., a Southbridge) via link 345. I/O controller 350 is coupled to BIOS 120 via link 355 and includes SMBus controller 360 that, in turn, is coupled to memory modules 340 via link 365.

In one embodiment, memory modules 340A and 340B are the primary system storage utilized by socket 310. Cores 312 read/write information to memory modules 340A and 340B by communicating requests through main memory controller 330. Memory modules 340A and 340B may be any type of volatile memory, including without limitation static RAM (SRAM), synchronous dynamic RAM (SDRAM), double data rate SDRAM (DDR SDRAM), etc. Memory modules 340 may be single inline memory modules (SIMM), dual inline memory modules (DIMM), fully buffered dual inline memory modules (FB-DIMM), or any other suitable configuration.

In one embodiment, one or more cores 312 can access devices via I/O controller 350 (e.g., BIOS 150 and SMBus controller 360). For example, a core 312 may access those devices by providing them with instructions, by exchanging data, etc. In various embodiments, link 345 may employ any of a variety of bus architectures including QUICK PATH, HYPERTRANSPORT, PCI-EXPRESS, etc.

During startup of system 300, socket 310 may be "unaware" of its surrounding environment. That is, socket 310 has yet to store any information about other devices in system 300 (e.g., memory modules 340, I/O controller 350, any additional sockets 310 in system 100, etc.). Once socket 310 initially receives power, socket 310 may initiate a procedure to initialize itself. The procedure may first include, in one embodiment, configuring one or more links (e.g., HYPERTRANSPORT links) enabling cores 312 to communicate with memory controller 320, main memory controller 330, one or more other sockets 310, etc. In some embodiments, socket 310 may also configure each core 312 by providing it with ROM configuration information (e.g., in order to access BIOS 120), cache configuration information, register configuration information, etc. Socket 310 may also load any workarounds that correct any known bugs. In some embodiments, socket 310 may also configure link 345 connecting memory controller 320 to I/O controller 350 by establishing the speed and width of link 345, configuring various devices associated with I/O controller 350 (e.g., providing information to SMBus controller 360 such as a base address), etc. Once link 345 is established between memory controller 320 and I/O controller 350, one or more cores 312 may begin executing instructions loaded from BIOS 120. In some embodiments, these instructions may be executed to initialize memory controller 330 and memory modules 340.

In one embodiment, one or more processing cores 312 initialize main memory controller 330 and memory modules 340 using information obtained from SMBus controller 360. For example, cores 312 and/or main memory controller 330 may need information about modules 340A and 340B (e.g., memory size, clock speed information, timing parameters, etc.) in order to perform read/write operations. In one embodiment, cores 312 receive this information from SMBus controller 360, which, in turn, obtains this information from modules 340 using serial presence detection (SPD) (e.g., using the I2C protocol). In some embodiments, after cores 312 obtain the SPD information, main memory controller 330 may be programmed with the appropriate timing and sizing data. Next, cores 312 may send special initializing commands to the memory modules 340 informing them about the settings selected by the controller 330. Then, the cores 312 may execute training algorithms (e.g., DDR training algorithms) to align the internal memory controller delays with respect to the timing of the platform and memory modules 340. Finally, the cores 312 may initialize special controller features such as error-correcting code (ECC).

As will be described in greater detail below, resource contention can occur when multiple cores 312 attempt to access controller 360 at the same (or substantially the same) time.

Figure 4:
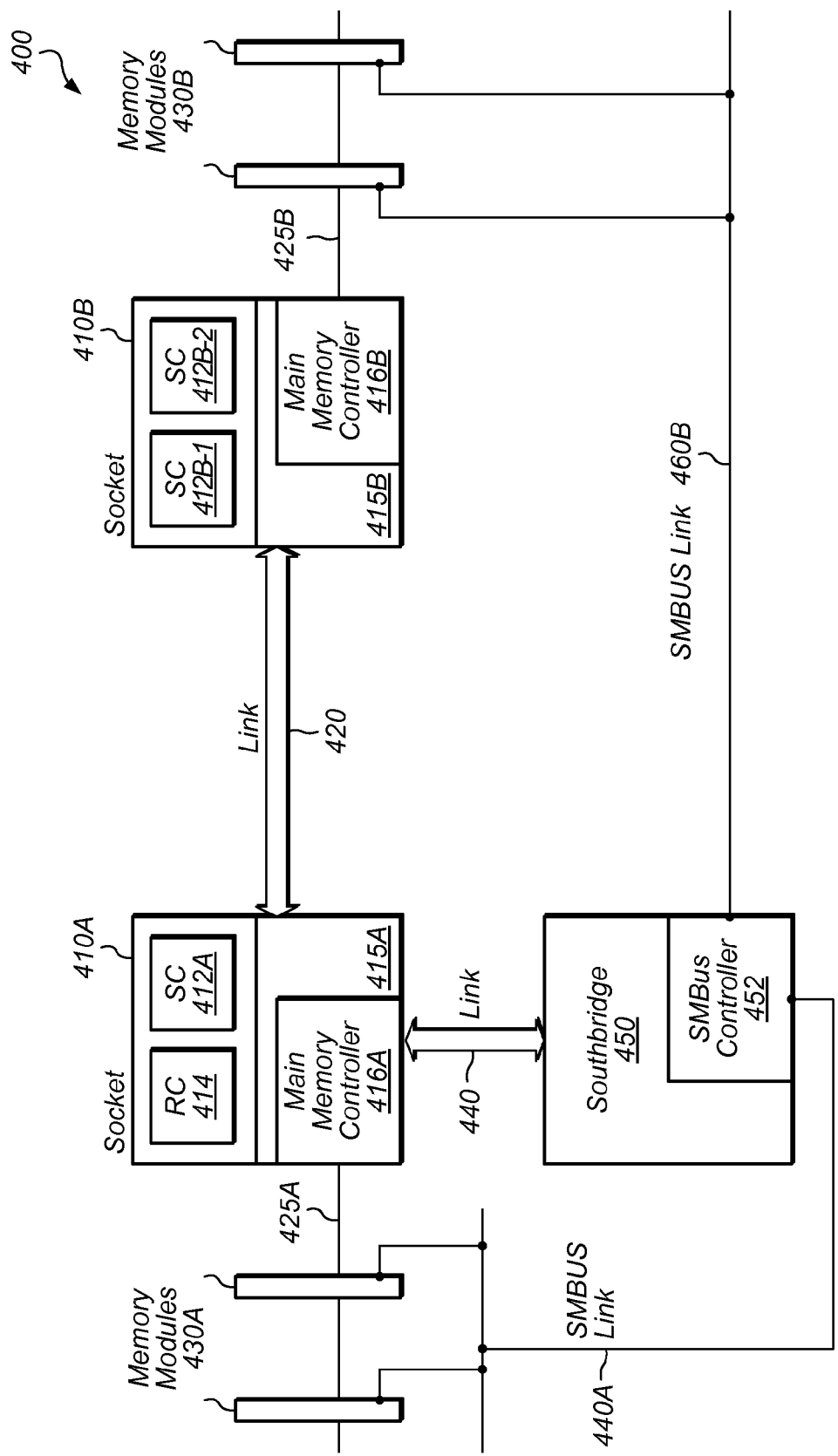
FIG. 4 is a block diagram illustrating one embodiment of a two-socket system having a shared resource.

Turning now to FIG. 4, one embodiment of a multi-socket system 400 for is depicted. In the illustrated embodiment, socket 410A includes a slave core (SC) 412A, a resource core (RC) 414, and a Northbridge 415A that, in turn, includes a main memory controller 416A for accessing memory modules 430A via channel 425A. (As described herein, a "slave core" is any core that provides a request for a resource controlled by a "resource core." In some embodiments, resource cores may function as slave cores when requesting access to other resources controlled by other resource cores.) Socket 410B similarly includes two slave cores (SCs) 412B-1 and 412B-2, and Northbridge 415B that, in turn, includes a main memory controller 416B coupled to memory modules 430B via channel 425B. Socket 410A is coupled to socket 410B via link 420 and is coupled to Southbridge 450 via link 440. In some embodiments, links 420 and 440 may employ any of a variety of communication protocols including QUICK PATH, HYPERTRANSPORT, PCI-EXPRESS, etc. Southbridge 450 includes an SMBus controller 452 that, in turn, is coupled to memory modules 430A and 430B via respective SMBus links 440A and 440B. (Note that SMBus controller 452 is representative of any number of possible I/O controllers that may be employed within system 400. In addition, Northbridges 415 are representative of any type of memory controller, and Southbridge 450 is representative of any type of I/O controller.)

Resource core 414 is one embodiment of a resource control processing element 140 that is configured to control access to SMBus controller 452 by slave cores 412 (which are examples of a processing element 130). As described above, SCs 412 and/or RC 414 may need to obtain information from an SMBus controller 452 in order to access memory modules 430A and 430B. In one embodiment, RC 414 is configured to process requests received from slave cores 412 in the same socket (e.g., SC 412A) and from slave cores 412 in different sockets (e.g., SCs 412B via link 420).

In one embodiment, RC 414 may have been selected to control access to controller 452 because socket 410A is physically closer to controller 452 than socket 410B. RC 414 may also be selected among other cores within socket 410A, because, in one embodiment, it has a direct connection to Southbridge 450, while core 412A may not have such a connection. As a result, RC 414 may, in some instances, experience less latency when communicating with controller 452 than other cores 412.

In some embodiments, SCs 412 may generate requests for information in different forms. In one embodiment, an SC 412 provides RC 414 with a request for the desired information, and RC 414 responds by retrieving this information (e.g., from SMBus controller 452) and by providing it to the requesting SC 412. For example, SC 412B-1 may send a request to RC 414 for a clock speed of memory modules 430B. RC 414 may then query the SMBus controller 452 for this information and provide it to SC 412B-1. In another embodiment, SC 412 may request permission to directly utilize controller 452 (i.e., without needing assistance from RC 414). RC 414 may then respond by denying the request (e.g., if controller 452 is already in use), by indicating that SC 412 permitted to access controller 452, or by storing the request until RC 414 is able to service that request. For example, SC 412 B-1, in one embodiment, provides requests for information directly to controller 452 via links 420 and 440 in response to being granted access by RC 414. In some embodiments, allowing an SC 412 to directly communicate with resource 150 may be advantageous when requesting significant amounts of data because RC 414 is no longer responsible for handling the requested data.

In one embodiment, RC 414 stores received requests in a queue (e.g., within a cache of RC 414) and then services the queue using any of variety of queuing algorithms known in the art—e.g., first in first out (FIFO), round robin, etc. In some embodiments, RC 414 grants requests based on priorities assigned to each SC 412 (or each request, in some embodiments). For example, in one embodiment, RC 414 store information such as the SC 412s that have accessed controller 452, how frequently each SC 412 accesses controller 452, the last time each SC 412 requested information from controller 452, etc. RC 414 may then grant requests made by slave cores 412 that have requested SMBus information less frequently than other SCs 412 before granting the requests of those other SCs 412. Alternatively, RC 414 may grant requests based on the amount of time that has transpired since each SC 412 sent a previous request. In some embodiments, assigning priorities to processing elements 130 such as SC 412 can prevent resource starvation, and thus facilitate faster boot times.

In one embodiment, RC 414 stores retrieved information in a cache (e.g., cache 142) in order to service subsequently received requests. For example, SC 412B-1 may request a particular set of data about memory modules 430B, and SC 412B-2 may subsequently request the same set of data. By caching the set of data retrieved for the first request, RC 414 can service the second request without accessing controller 452 again. In some embodiments, caching data may significantly reduce access times, especially when accessing information via a relatively slow communication path such as the SMBus or other I/O bus.

In some embodiments, RC 414 may also preemptively retrieve and cache information before receiving a request to do so. For example, during the boot strapping process, each SC 412 may require the same information (e.g., a set of timing parameters). In one embodiment, RC 414 may preemptively retrieve and cache this information from controller 452 as soon as link 440 has been established. In such an embodiment, once RC 414 receives requests for this information, RC 414 can service these requests using information that has already been cached. In some embodiments, preemptively retrieving information increases utilization of resources 150 because RC 414 can use a resource 150 prior receiving any requests for that resource 150 (in other embodiments, this resource 150 could be idle until RC 414 received a request for access to that resource 150).

In various embodiments, system 400 may include multiple resources 150 that can be shared and/or multiple resource cores 414. In some embodiments, resource cores 414 may also function as slave cores 412 to other resource cores 414. For example, RC 414 may need to access some other resource 150 by making a request to a resource core for that resource (not depicted in FIG. 4). An embodiment of a system with multiple resource cores and multiple resources that can be shared is described next in conjunction with FIG. 5.

Figure 5:
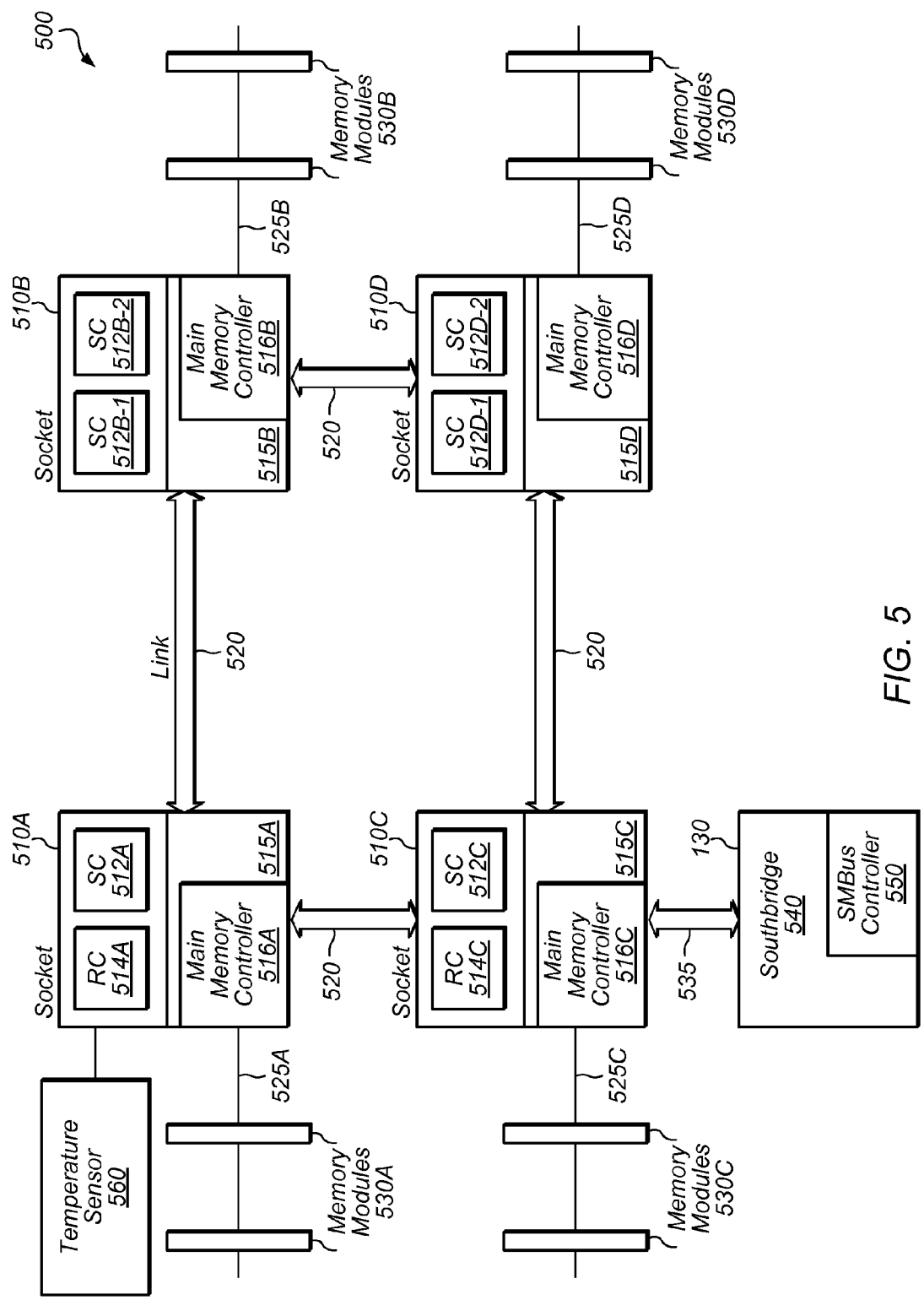
FIG. 5 is a block diagram illustrating one embodiment of a four-socket system having various shared resources.

Turning now to FIG. 5, one embodiment of a multi-socket system 500 for accessing two resources with four sockets 510A-D is depicted. In the illustrated embodiment, system 500 includes sockets 510A-D that are coupled in a ring configuration via links 520. In other embodiments, sockets 510A-D may be coupled differently—e.g., each socket 510 may have a respective link to each other socket 510. Socket 510A contains a resource core (RC) 514A and a slave core (SC) 512A along with a Northbridge 515A that, in turn, includes a main memory controller 516A connected to memory modules 530A via channel 525A. Socket 510A is also connected to a temperature sensor 560. Socket 510B contains slave cores 512B-1 and 512B-2 along with a Northbridge 515B that, in turn, includes a main memory controller 516B connected to memory modules 530B. Socket 510C contains a resource core 514C and a slave core 512C along with a Northbridge 515C that, in turn, includes a main memory controller 516C connected to memory modules 530C via channel 525C. Socket 510C is also coupled to a Southbridge 540 that includes an SMBus controller 550, which is coupled to memory modules 530A-D via respective SMBus links (not shown for clarity). Socket 510D contains slave cores 512D-1 and 512D-2 along with a Northbridge 515D that, in turn, includes a main memory controller 516D connected to memory modules 530D via channel 525D.

SMBus controller 550 and temperature sensor 560 are two examples of shared resources 150 that can be accessed by the cores of system 500.

As noted above with respect to FIGS. 3 and 4, SMBus controller 550, in one embodiment, is a management bus controller that provides information about memory modules 530 that is usable for their configuration. RC 514C is one embodiment of a resource control processing element 140 that controls access to SMBus controller 550 by granting requests received from SCs 512. In some embodiments, RC 514C may also receive requests from other resource cores (e.g., RC 514A). In one embodiment, socket 510C is physically closer to controller 550 than other sockets 510. In various embodiments, RC 514C may assign priorities to SCs 512 and RC 514A based on each core's utilization of controller 550. RC 514C may also cache information for servicing subsequent requests. RC 514C may also preemptively retrieve information from SMBus controller 550 prior to receiving requests for that information.

In one embodiment, temperature sensor 560 is a sensor that provides temperature information about system 500. For example, in some embodiments, sensor 560 may provide temperature information about each socket 510, information about cores 512 and 514 within sockets 510, and/or overall temperature information for system 500. In one embodiment, sensor 560 is directly coupled to RC514A. RC514A is one embodiment of a resource control processing element 140 that is configured to control access to temperature sensor 560 by granting received requests from SCs 512. In some embodiments, RC 514A may also receive requests from RC 514C. In one embodiment, socket 510A is physically closer to sensor 560 than other sockets 510. In various embodiments, RC 514A may grant requests according to priorities that it assigns to SCs 512 and RC 514C based on each core's utilization of sensor 550. RC 514A may also cache temperature information for servicing subsequent requests. RC 514A may also preemptively retrieve information from temperature sensor 560 prior to receiving requests for that information.

Embodiments of methods performed by slave cores and resource cores are described next in conjunction with FIGS. 6 and 7.

Figure 6:
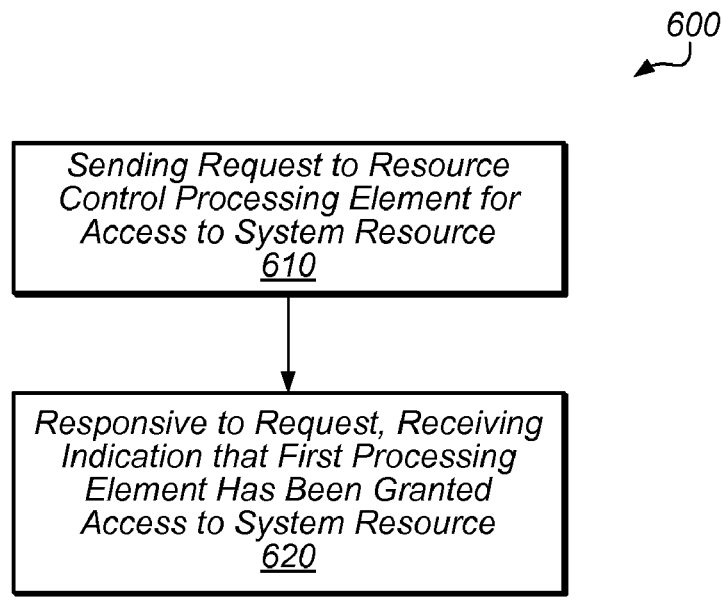
FIG. 6 is a flow diagram illustrating one embodiment of a method implemented by a processing element for resolving resource contention.

Turning now to FIG. 6, one embodiment of a method 600 performed by a processing element 130 for resolving resource contention is depicted. In one embodiment, method 600 is performed when system 100 is operating in a pre-memory environment (i.e., prior to main memory being accessible). Method 600 may be performed using program instructions executed by processing element 130 and/or using logic within processing element 130.

In step 610, a processing element 130 sends a request to a resource control processing element 140 to obtain access to a system resource 150. In one embodiment, processing element 130 shares this resource 150 with a plurality of other processing elements 130. As described above, this resource 150, in some embodiments, may be a sensor device (e.g., temperature sensor 560), a bus device (e.g., SMBus controller 550), a storage device, an I/O device, etc. In one embodiment, processing element 130 requests permission to utilize the resource 150. For example, processing element 130 may desire to provide instructions to the resource 150, to directly exchange information with resource 150, etc. In other embodiments, processing element 130 requests that resource control processing element 140 provide information that element 140 obtains from a resource 150. For example, in one embodiment, processing element 130 may request that resource control processing element 140 retrieve information an SMBus controller on processing element 130's behalf.

Once processing element 130 has sent a request, processing element 130, in one embodiment, may execute other tasks while waiting for a response from resource control processing element 140; element 130 may switch back to the original task upon receiving an indication that access has been granted. In some embodiments, processing element 130 may retransmit a request at regular time intervals until it receives a response or an acknowledgement that the request is being processed.

In step 620, a processing element 130 receives an indication that it has been granted access to a system resource 150 from the resource control processing element 140. In one embodiment, receiving an indication includes receiving a message that indicates that processing element 130 is permitted to utilize the resource 150. In response to being granted access, processing element 130 may then utilize the resource 150. For example, as described above, processing element 130, in some embodiments, may use a bus controller (e.g., SMBus controller 452 or 550) to initialize memory. In other embodiments, receiving an indication includes receiving requested data from resource control processing element 140. For example, processing element 140 may retrieve temperature information from a temperature sensor (e.g., sensor 560), cache the temperature information, and subsequently provide the cached information to a processing element 130 that has requested the data.

Figure 7:
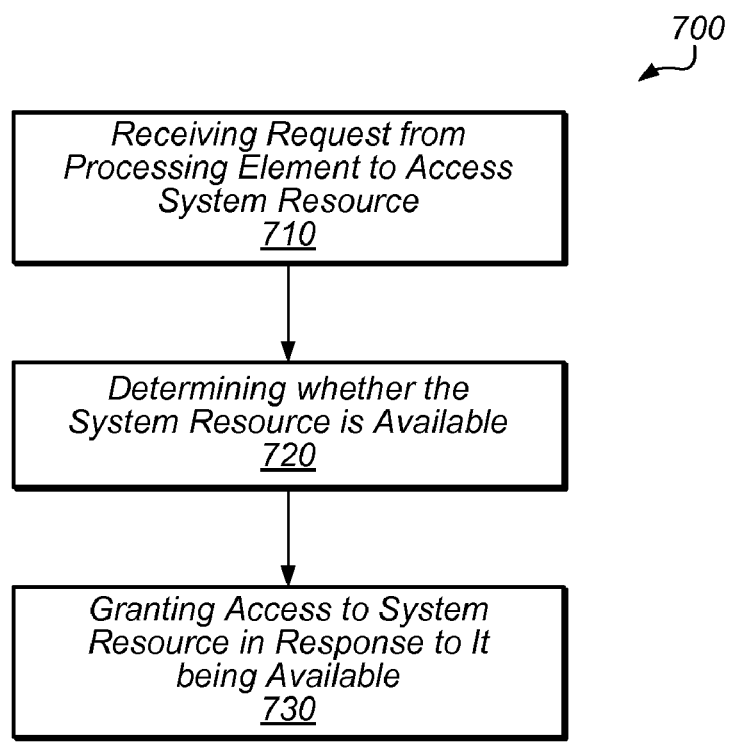
FIG. 7 is a flow diagram illustrating one embodiment of a method implemented by a resource control processing element for resolving resource contention.

Turning now to FIG. 7, one embodiment of a method 700 performed by a resource control processing element 140 for resolving resource contention is depicted. In one embodiment, method 700 is performed when system 100 is operating in a pre-memory state. Method 700 may be performed using program instructions that are executed by processing element 140 and/or using logic within processing element 140. In some embodiments, steps 710-730 may be performed in a different order. For example, as described above, processing element 140 may, in one embodiment, preemptively retrieve data for subsequently received requests.

In step 710, a resource control processing element 140 receives a request from a processing element 130 to access a system resource 150. In one embodiment, the processing element 130 is requesting to utilize the resource 150. For example, as described above, the processing element 130 may desire to exchange information with the resource 150, provide instructions to the resource 150, etc. In other embodiments, the processing element 130 is requesting information from a resource 150. For example, the processing element 130 may be requesting SPD information that is usable to configure a memory controller. In one embodiment, processing element 140 stores the request in a queue of received requests, where it services requests from the queue (e.g., based on priorities assigned to each processing element 130). For example, in one embodiment, processing element 140 may service requests of processing elements 130 that use a resource 150 less frequently than other processing elements 130 before servicing requests those of other elements 130.

In step 720, the resource control processing element 140 determines whether the system resource 150 is available. In one embodiment, processing element 140 determines whether the resource 150 is available by maintaining a log of whether the resource 150 is currently being accessed. This information may include the current processing element 130 accessing the resource 150, the length of time that a resource 150 has been accessed, etc. In other embodiments, processing element 140 may query the resource 150 to determine whether it is available for utilization. For example, in one embodiment, processing element 140 checks to see if the resource 150 has set a flag bit indicating that it is available for utilization. In another embodiment, resource 150 sends a message to processing element 140 indicating that it is available. In some embodiments, determining whether a system resource 150 is available may include determining whether processing element 140 is already storing the requested data in a cache.

In step 730, the resource control processing element 140 grants access to the system resource 150 in response to it being available. In one embodiment, granting access includes indicating to the processing element 130 that is permitted to utilize the requested resource 150. In other embodiments, granting access includes providing the processing element 130 with its requested data. Processing element 140 may obtain this data by retrieving it from the resource 150 or by reading it from a cache. For example, processing element 140 may provide temperature information that was previously cached in response to a previous request for that information.

One embodiment of a method for resolving resource contention combining steps from methods 600 and 700 is described below.

Consider the following abbreviations:

SR—shared resource

RC—core controlling access to or connected to SR

Cache—temporary storage for data read from SR

C[i]—where n is <N, then maximum number of core in the system

REQ—message sent from C[i] to RC requesting data from SR

GRANT—message sent from RC indicating that access to the SR has been granted

BUSY—message indicating that the RC is busy

RDY—indicates that data is ready to be delivered

DATA—information obtained from SR

Note:

a. RC may be the only core connected to the shared resource. (see FIG. 1)

b. C[i] sends messages to RC and receives "DATA" from RC. (see FIG. 1)

c. RC continuously obtains DATA from RC and stores it until C[i] sends REQ

Step 1. When there are no REQ outstanding, RC reads DATA from SR and stores the DATA in a Cache.

Step 2. C[i] executes a task that requires DATA.

Step 3. C[i] sends REQ to RC.

Step 4. RC receives the REQ from C[i].

Step 5. If RC is not busy, go to "Step 8".

Step 6. If RC is busy, BUSY message is sent to C[i].

Step 7. C[i] repeats "Step 3" to "Step 6".

Step 8. RC sends GRANT to C[i].

Step 9. C[i] waits for RDY from RC.

Step 10. RC checks its cache to determine if DATA is already been read. If yes, go to "Step 12". If no, go to "Step 11".

Step 11. RC obtains DATA from SR and writes DATA to its cache.

Step 12. RC sends RDY.

Step 13. RC sends DATA to C[i].

Step 14. C[i] receives DATA from RC.

Step 15. RC waits for the next REQ message.

Figure 8:
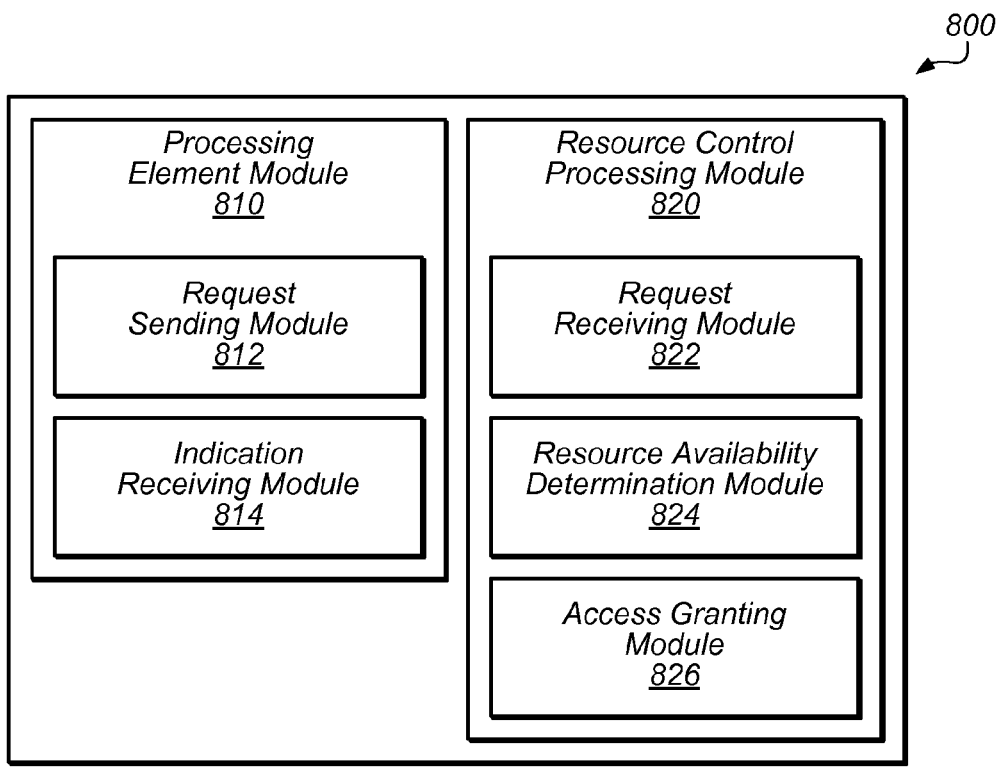
FIG. 8 is a block diagram illustrating one embodiment of various modules within system firmware.

Turning now to FIG. 8, a block diagram of various modules within system firmware 800 is depicted. In one embodiment, system firmware 800 includes a BIOS (e.g., BIOS 150). As shown, system firmware 800 includes processing element module 810 and resource control processing module 820. In various embodiments, greater or less numbers of modules may be used. In some embodiments, modules 810 and 820 include program instructions that are executed by processing elements 130 and 140 when system 100 is booting up.

In one embodiment, processing element module 810 includes program instructions that are executable by a processing element 130 to obtain access to a resource 150. Processing element module 810 may include request sending module 812 and indication receiving module 814.

In one embodiment, request sending module 812 includes program instructions that are executable to send a request to a resource control processing element 140 for access to a system resource 150. In some embodiments, module 812 may execute to send a request for permission to utilize the resource 150. In other embodiments, module 812 may execute to send a request for resource control processing element 140 to provide information obtained from the resource 150.

In one embodiment, indication receiving module 814 includes program instruction that are executable to receive an indication that processing element 130 has been granted access to the system resource 150 from the resource control processing element 140. In some embodiments, module 814 may execute to receive an indication that processing element 130 is permitted to utilize the resource 150. In one embodiment, module 814 further includes program instructions that are executable to utilize the resource 150 responsive to being granted access. In some embodiments, module 814 may execute to receive requested data from resource control processing element 140. In one embodiment, module 814 further includes program instructions that are executable to utilize the received data.

In one embodiment, resource control processing element module 820 includes program instructions that are executable by a resource control processing element 140 to control access to a resource 150. Resource control processing module 820 may include request receiving module 822, resource availability detection module 824, and access granting module 826.

In one embodiment, request receiving module 822 includes program instructions that are executable to receive a request from a processing element 130 to access a system resource 150. In some embodiments, module 822 may execute to receive a request for permission to utilize the resource 150. In other embodiments, module 822 may execute to receive a request for information from a resource 150. In one embodiment, module 822 executes to store the received request in a queue with other received requests. In various embodiments, module 822 may execute to determine an order to service the requests in the queue based on priorities assigned to the requesting processing elements 130.

In one embodiment, resource availability detection module 824 includes program instructions that are executable to determine whether the system resource 150 is available. In some embodiments, module 824 may execute to determine whether the resource 150 is available by maintaining a log of whether the resource 150 is currently being accessed. In other embodiments, module 824 may execute to query the resource 150 to determine whether it is available for utilization. In some embodiments, module 824 may execute to determine whether processing element 140 is already storing the requested data in a cache.

In one embodiment, access granting module 826 includes program instructions that are executable to grant access to the system resource 150 in response to it being available. In some embodiments, module 826 may execute to grant access by indicating to the processing element 130 that is permitted to utilize the requested resource 150. In other embodiments, module 826 may execute to grant access by providing the processing element 130 with its requested data. In one embodiment, module 826 may execute to obtain requested data by retrieving it from the resource 150 or by reading it from a cache.

As noted above, in one embodiment, processing element 130 loads and executes module 810, and processing element 140 loads and executes module 820. In some embodiments, each processing element 130 or 140 may also load both modules 810 and 820, where the modules 810 and 820 indicate whether they are to be executed by processing element 130 and/or processing element 140. For example, a processing element 140 that also functions as a processing element 130 may load both modules 810 and 820. In other embodiments, a particular one of processing elements 130 and/or 140 may load both modules 810 and 820 from system firmware 800 and provide program instructions from modules 810 and/or 820 to other processing elements 130 and/or 140 that have not loaded modules 810 and/or 820. For example, a processing element 140 may load both modules 810 and 820 from system firmware 800 and provide program instructions from module 810 to various processing modules 130.

Figure 9:
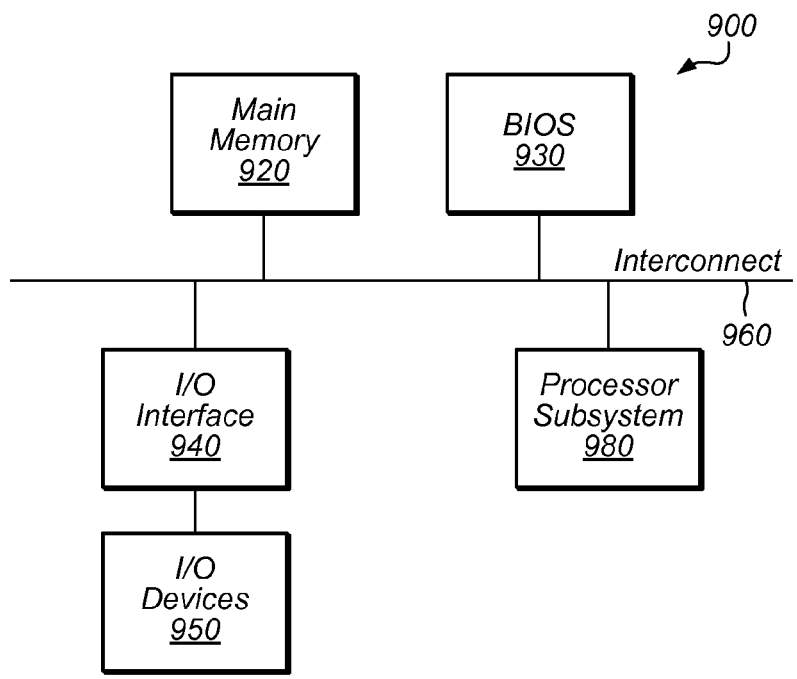
FIG. 9 is a block diagram illustrating one embodiment of a computer system.

Turning now to FIG. 9, one embodiment of a computer system 900 in which system 100 may be implemented is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Computer system 900 may also be any type of networked peripheral device such as storage devices, switches, modems, routers, etc. Although a single computer system 900 is shown in FIG. 9 for convenience, system 900 may also be implemented as two or more computer systems operating together.

Processor subsystem 980 may include one or more processors or processing units. For example, processor subsystem 980 may include one or more processing elements 910 that are coupled to one or more resource control processing elements 920. In various embodiments of computer system 900, multiple instances of processor subsystem 980 may be coupled to interconnect 960. In various embodiments, processor subsystem 980 (or each processor unit within 980) may contain a cache or other form of on-board memory.

Main memory 920 is usable by processor subsystem 980. Main memory 920 may be implemented using different physical memory media, such as hard disk storage, floppy disk storage, removable disk storage, flash memory, random access memory (RAM—SRAM, EDO RAM, SDRAM, DDR SDRAM, Rambus® RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980.

In one embodiment, BIOS 930 is configured to store program instructions that are executable by processor subsystem 980 to initialize computer system 900, including main memory 920, I/O interface 940, and/or various ones of I/O devices 950. BIOS 930 may be any type of firmware such as read only memory (PROM, EEPROM, etc.). In various embodiments, BIOS 930 stores program instructions (such as those described above) that are executable by processing elements 130 and/or 140 to resolve resource contention when system 900 is operating in a pre-memory state.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device.

Various embodiments described above refer to resolving resource contention issues prior to volatile system (main) memory being accessible. Although system 100 has been described within the context of a pre-memory environment, embodiments of the present disclosure may also be applicable to other systems that need to manage resource contention even when main memory has been initialized. For example, in various embodiments, resource control processing elements 140 may be used as an alternative to control structures such as locks or semaphores when system memory is accessible. Accordingly, embodiments of the present disclosure are not solely applicable to systems operating in a pre-memory state, but rather to any system that needs to resolve resource contention.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    a first of a plurality of processing elements in a computer system sending a request to a resource control processing element, wherein the request is to access a system resource that is shared by the plurality of processing elements, wherein the request occurs during initialization of the computer system and prior to a main memory of the computer system being accessible by the plurality of processing elements; and
    responsive to the request, the resource control processing element indicating to the first processing element whether access to the system resource is granted.

2. The method of claim 1, further comprising:
    the first processing element utilizing the system resource after being granted access to the system resource.

3. The method of claim 1, wherein the system resource is a system management bus (SMB) controller, and wherein the method further comprises in response to the first processing element being granted access to the SMB controller, the first processing element using the SMB controller to configure a memory controller to communicate with the main memory.

4. The method of claim 1, wherein the request is for a set of data and wherein the method further comprises:
 responsive to the request, the resource control processing element retrieving the set of data using the system resource; and
 the resource control processing element providing the retrieved set of data to the first processing element.

5. The method of claim 1, further comprising:
 the resource control processing element storing the request in a queue with a plurality of other requests from the plurality of processing elements, wherein the request is stored until the resource control processing element can grant the first request.

6. The method of claim 5, further comprising:
 the resource control processing element determining, for individual ones of the plurality of processing elements, an amount of utilization of the system resource; and
 the resource control processing element assigning priorities to the stored requests based on said determining.

7. The method of claim 1, further comprising:
 prior to said sending, the resource control processing element retrieving a set of data from the system resource;
 the resource control processing element storing the retrieved set of data in a cache of the resource control processing element; and
 responsive to the request, the resource control processing element providing the set of data to the first processing element.

8. A system comprising:
 a hardware resource;
 a plurality of processing elements;
 a resource control processing element configured to control access to the hardware resource by the plurality of processing elements, including by granting access to the hardware resource in response to requests made by the plurality of processing elements prior to a volatile memory of the system being initialized.

9. The system of claim 8, further comprising:
 the volatile memory, wherein the volatile memory is configurable to be accessed by one or more of the plurality of processing elements; and
 a nonvolatile memory having program instructions stored therein, the program instructions being executable by the resource control processing element to:
  receive a request from a first of the plurality of processing elements, wherein the request is to access the hardware resource, wherein the request is received during initialization of the system prior to the volatile memory being configured to be accessed by the plurality of processing elements;
  determine whether the hardware resource is available to be accessed; and
  in response to determining that the hardware resource is available, grant the first processing element access to the hardware resource.

10. The system of claim 9, wherein the plurality of processing elements includes a plurality of processing cores, and wherein the program instructions stored in the nonvolatile memory are part of a basic input/output system (BIOS) of the system, and wherein the resource control processing element is located in a bootstrapping processor that is configured to initiate a bootstrapping procedure of the system that results in the volatile memory being configured to be accessed by the plurality of processing cores.

11. The system of claim 8, wherein the hardware resource is a bus controller located within an input/output controller of the system, and wherein one or more of the plurality of processing elements are configured to use the bus controller to initialize the volatile memory.

12. The system of claim 11, wherein a first of the requests is from a first of the plurality of processing elements, wherein the first request is for information usable to initialize the volatile memory, and wherein the resource control processing element is configured to:
 retrieve the requested information from the volatile memory by using the bus controller;
 store the retrieved information in a cache of the resource control processing element; and
 provide the cached information to the first processing element.

13. The system of claim 8, wherein the resource control processing element is physically closer to the hardware resource than any of the plurality of processing elements.

14. The system of claim 8, wherein the resource control processing element is further configured to:
 obtain information from the hardware resource prior to receiving any requests for the information from the plurality of processing elements; and
 receive a first request for the obtained information from a first of the plurality of processing elements; and
 responsive to receiving the first request, provide the obtained information to the first processing element.

15. A computer-readable storage medium having program instructions stored thereon that, when executed by a computer system, cause the computer system to perform operations comprising:
 performing an initialization procedure that causes a volatile main memory of the computer system to be accessible by a plurality of processing elements of the computer system, wherein the initialization procedure includes:
  prior to the volatile memory being accessible by the plurality of processing elements, a first of the plurality of processing elements sending, to a second of the plurality of processing elements, a request for utilization of a hardware resource of the computer system;
  the second processing element granting the first processing element access to the hardware resource in response to the hardware resource being available.

16. The computer-readable storage medium of claim 15, the operations further comprising:
 responsive to the request, the second processing element performing one or more actions using the hardware resource; and
 the second processing element providing results of the one or more actions to the first processing element.

17. The computer-readable storage medium of claim 16, wherein the one or more actions include retrieving information from the hardware resource and storing the retrieved information in a cache, and wherein said providing includes providing the cached information to the first processing element.

18. The computer-readable storage medium of claim 15, wherein said granting includes:

the second processing element determining an amount of utilization of the hardware resource by individual ones of the plurality of processing elements; and the second processing element selecting the request from among a plurality of requests received from the plurality of processing elements, wherein said selecting is based on the determined amount of utilization of the hardware resource by individual ones of the plurality of processing elements.

19. The computer-readable storage medium of claim 15, wherein the computer-readable storage medium includes firmware of the computer system, and wherein the first processing element and the second processing element are located on separate sockets coupled via a bus.

20. The computer-readable storage medium of claim 15, the operations further comprising:

prior to the volatile memory being accessible, the first processing element sending a second request for utilization of a second hardware resource to a third of the plurality of processing elements;

the third processing element granting the first processing element access to the second hardware resource in response to the second hardware resource being available.

21. An apparatus, comprising:

a processing element configured to communicate with a resource control processing element and a shared hardware resource during a pre-memory state, wherein, during the pre-memory state, the processing element is configured to:

send a request to the resource control processing element to access the shared hardware resource; and receive a response to the request indicating that the processing element has been granted access to the shared hardware resource.

* * * * *